United States Patent … US 7,535,952 B2
Hong et al. … May 19, 2009

(54) RECEPTION APPARATUS AND METHOD OF A MOBILE STATION IN AN MOBILE COMMUNICATION SYSTEM

(75) Inventors: Woo-Sang Hong, Seongnam-si (KR); Sang-Min Bae, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 702 days.

(21) Appl. No.: 10/998,953

(22) Filed: Nov. 30, 2004

(65) Prior Publication Data

US 2005/0124330 A1    Jun. 9, 2005

(30) Foreign Application Priority Data

Dec. 3, 2003    (KR) ............... 10-2003-0087368

(51) Int. Cl.
*H04B 1/00*    (2006.01)

(52) U.S. Cl. .................. 375/147; 375/136; 375/316; 375/324; 375/340

(58) Field of Classification Search ............... 375/147, 375/136, 316, 324, 340
See application file for complete search history.

(56) References Cited

U.S. PATENT DOCUMENTS

| 5,565,982 A | * | 10/1996 | Lee et al. ............... 356/317 |
| 5,737,077 A | * | 4/1998 | Lee et al. ............... 356/317 |
| 5,781,256 A | * | 7/1998 | Inoue et al. .............. 349/51 |
| 6,728,806 B2 | * | 4/2004 | Kakiage .................. 710/65 |

OTHER PUBLICATIONS

SPRS032A (TMS320C30 Digital Signal Processor, Texas Instruments, p. 1, Apr. 1996, revised Jun. 1997).*

* cited by examiner

*Primary Examiner*—Ted Wang
(74) *Attorney, Agent, or Firm*—Roylance, Abrams, Berdo & Goodman, L.L.P.

(57) ABSTRACT

Disclosed is a reception apparatus and method of a mobile station in a Software Defined Radio (SDR) mobile communication system. A radio frequency (RF) processor converts a received RF signal into a digital signal, and outputs data on a per-unit basis according to a predetermined clock. An external memory stores the output data in a predetermined buffer area. A digital signal processing unit reads stored data samples and performs digital signal processing on the read data samples while storing the data in the external memory is completed.

20 Claims, 6 Drawing Sheets

RECEPTION APPARATUS AND METHOD OF A MOBILE STATION IN AN MOBILE COMMUNICATION SYSTEM

PRIORITY

This application claims the benefit of under 35 U.S.C. §119(a) to an application entitled "Reception Apparatus and Method of a Mobile Station in an SDR Mobile Communication System" filed in the Korean Intellectual Property Office on Dec. 3, 2003 and assigned Ser. No. 2003-87368, the entire contents of which are incorporated herein by reference.

BACKGROUND OF THE INVENTION

1. Field of the Invention

The present invention relates generally to a reception apparatus and method in a mobile communication system. In particular, the present invention relates to a reception apparatus and method of a mobile station in a Software Defined Radio (SDR) mobile communication system.

2. Description of the Related Art

A mobile communication system that began with an analog system in the 1980s has evolved into a digital system such as Code Division Multiple Access (CDMA) and, in the 1990s, the Global System for Mobile communication (GSM), which is a $2^{nd}$ generation mobile communication system evolved as the manufacturing cost of digital circuits decreased and users required higher call quality. As digital mobile phones are characterized by low-priced terminals, high quality-of-service (QoS), low call charges, and fundamental data communications, the number of mobile communication subscribers has been rapidly increasing in recent years.

Figure 1:
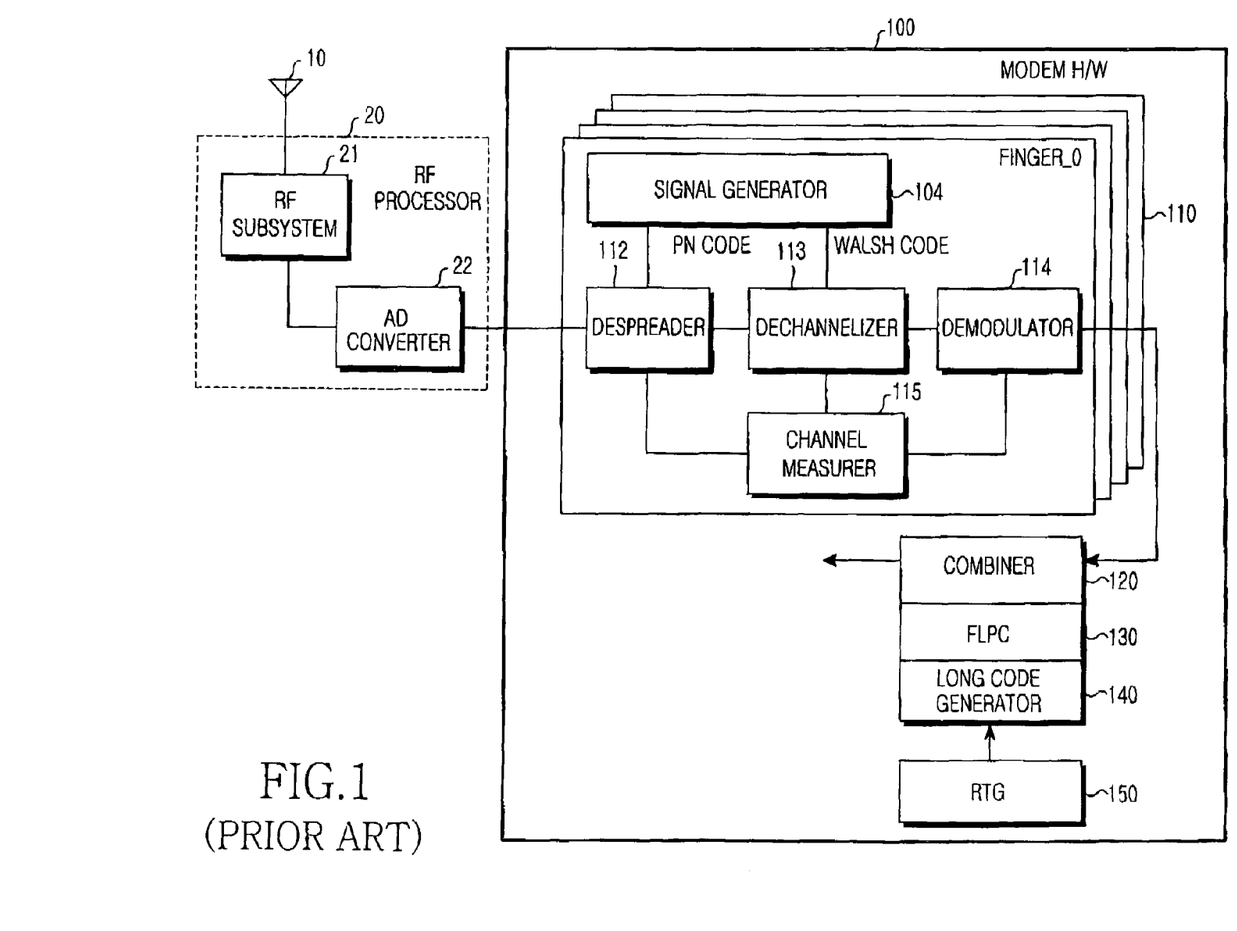
FIG. 1 is a block diagram illustrating a structure of a reception apparatus for a mobile station in a conventional mobile communication system.

FIG. 1 is a block diagram illustrating a structure of a reception apparatus for a mobile station in a general mobile communication system. The reception apparatus of a mobile station is comprised of a radio frequency (RF) processor 20 for converting an RF signal received via an antenna 10 into a digital signal, and a modem 100 realized with hardware, for demodulating the digital signal. The modem 100 is realized with Application Specific Integrated Circuits (ASICs) because it can process complicated calculations in real time in order to accurately receive a reception signal at a time desired by a base station.

A signal passed through an RF subsystem 21 is input to an analog-to-digital (A/D) converter 22, and the A/D converter 22 outputs digital quadrature (I,Q) data. The output data of the A/D converter 22 is sampled by a chip×8 clock, and despread with a corresponding Pseudo-random Noise (PN) code by a despreader 112. The output signal of the despreader 112 is input to a channel measurer 115 and a dechannelizer 113. The channel measurer 115 generates I and Q signals for channel compensation by accumulating input signals for an accumulation period determined according to a characteristic of a filter, and the dechannelizer 113 Walsh-decovers an input signal by multiplying the input signal by a corresponding Walsh code. The I and Q output signals of the dechannelizer 113 and the channel measurer 115 are subject to channel compensation in a demodulator 114 through a complex multiplication. The demodulated signal output from the demodulator 114 is subjected to symbol combining in a combiner 120, and then descrambled by a scrambling code generated by a long code generator 140. A forward link power controller (FLPC) 130 generates a forward link power control signal. A reference time generator (RTG) 150 has the function of generating a reference time of the mobile station, and generates an 80-ms boundary, a 1.25-ms signal, and a 20-ms signal.

Such a mobile station for mobile communication should necessarily satisfy the light, low-power, low-price requirements, and in the near future, it should also satisfy a fast time-to-market requirement, which is a first requirement. Although this requirement should be satisfied even in designing a conventional terminal, it is now at issue because changes in the market occur faster than ever before. A second requirement is a flexibility requirement. In order to adapt to various standards currently in use or in development, the structure of the mobile station should have high flexibility. This is related to the first requirement, because a developed terminal, if it has flexibility, can simply identify a new standard. Such requirements are necessary for seamless roaming between standards and regions.

However, a $2^{nd}$ generation mobile phone cannot receive a global roaming service because respective regions use different standards. The recent global mobile communication environment is formed by $2^{nd}$ generation digital systems in various modes, such as GSM in Europe, Digital-Advanced Mobile Phone System (D-AMPS) in North America, Personal Digital Cellular (PDC) and Personal Handyphone System (PHS) in Japan, and IS-95 CDMA in South Korea. Also, a $3^{rd}$ generation broadband International Mobile Telecommunication-2000 (IMT-2000) standard that continued to evolve with a unified standard aiming at the global roaming service has been divided into $3^{rd}$ Generation Partnership Project 2 (3GPP2) cdma2000 in North America and $3^{rd}$ Generation Partnership Project (3GPP) Wideband CDMA (W-CDMA) in Europe and Japan, and the different standards are expected to be regionally commercialized, or are being commercialized presently. Because the regional $2^{nd}$ generation and $3^{rd}$ generation mobile communication standards require independent transmission/reception systems due to their different radio interfaces and incompatible access protocols, they cannot provide the global roaming service. In addition, in order to provide a regional service to one mobile station as an integrated service, it is necessary to update the mobile station and add a new service.

However, as described above, for the existing mobile station, designing of an analog transmission/reception front-end unit and ASIC most suitable for the respective standards takes precedence over all things. Therefore, in designing a mobile station, hardware should be newly designed such that it can adapt to the various standards currently in development, and ASIC chips should be separately developed to be suitable for several standards for seamless roaming between standards and regions using one mobile station.

However, in the ASIC chip, complicated calculations, such as division, considerably increase the number of required gates, and modification of the ASIC chip due to a change in an algorithm is not simple. In addition, because the ASIC chip is a high-priced element realized with hardware, it cannot satisfy the low-power, small-size, low-price requirements of the mobile station. However, development of a new ASIC for supporting multiple standards requires great development time and cost. Therefore, in order to design a mobile station satisfying the foregoing requirements, it is necessary to introduce an open architecture based on Digital Signal Processing (DSP) and Software Defined Radio (SDR) technologies.

SUMMARY OF THE INVENTION

It is, therefore, an object of the present invention to provide a reception apparatus and method of a mobile station, for receiving an integrated radio communication service based on DSP and SDR in a single hardware implementation without requiring separate hardware modifications for seamless roaming between different standards and regions in a mobile communication system.

It is another object of the present invention to provide a reception apparatus and method of a mobile station, for supporting a multimedia service requiring a high data rate and a roaming service by replacing analog hardware elements with DSP elements.

It is further another object of the present invention to provide a reception apparatus and method of a mobile station, for satisfying low-power, small-size, low-price requirements by employing DSP elements in an SDR mobile communication system.

To achieve the above and other objects, there is provided a reception apparatus of a mobile station in a Software Defined Radio (SDR) mobile communication system. The reception apparatus comprises a radio frequency (RF) processor for converting a received RF signal into a digital signal, and outputting data on a per-unit basis according to a predetermined clock; an external memory for storing the output data in a predetermined buffer area; and a digital signal processing unit comprising at least one digital signal processor and at least one internal memory, for reading stored data samples and performing digital signal processing on the read data samples while storing the data in the external memory is completed.

To achieve the above and other objects, there is provided a method for performing digital signal processing on a received radio frequency (RF) signal by software in a receiver for a mobile station of a Software Defined Radio (SDR) mobile communication system. The method comprises the steps of converting a received RF signal into a digital signal, and outputting data on a per-unit basis according to a predetermined clock; storing the output data in a predetermined buffer area on a per-unit basis; and reading stored data samples and performing digital signal processing on the read data samples while storing the data is completed.

BRIEF DESCRIPTION OF THE DRAWINGS

The above and other objects, features and advantages of the present invention will become more apparent from the following detailed description when taken in conjunction with the accompanying drawings in which.

In the drawings, it should be understood the same or similar elements, features, and structures are denoted by the same reference numerals even though they are depicted in different drawings.

DETAILED DESCRIPTION OF THE EXEMPLARY EMBODIMENTS

A preferred embodiment of the present invention will now be described in detail with reference to the annexed drawings. In the following description, a detailed description of known functions and configurations incorporated herein has been omitted for the sake of clarity.

In the following description of the present invention, it will be assumed that a receiver of a mobile station has open architecture based on Digital Signal Processing (DSP) and Software Defined Radio (SDR) technologies. The operations of the interface between the mutual cores and a dual rake receiver caused by replacement of the existing modem hardware block with a digital signal processor (DSP) will now be described.

DSP software should be made such that a DSP core serving as a rake receiver performs the same operation as that performed when it is realized with an existing ASIC, and the DSP core is driven with minimum number of calculations because it is limited by the number of DSP calculations.

For this, there is a vectorization technique for performing one or more calculations with one cycle mostly supported by DSP, a bit-vector technique for minimizing the number of calculations of binary bits, and a multithread technique capable of processing calculations in parallel by sharing resources and memory. A description will now be made of an apparatus and method for receiving data using the techniques described above.

The SDR technology can be defined as a technology for integrating various radio communication services for which different devices are used conventionally, with modification of only software rather than hardware. That is, SDR is an epoch-making communication technology capable of integrating the $2^{nd}$ generation (2G) mobile communication standard and the $3^{rd}$ generation (3G) mobile communication standard, and further realizing various communication systems such as Digital Subscriber Line (xDSL), CDMA, GSM, Universal Mobile Telecommunication System (UMTS), cdma2000, Wireless Local Area Network (W-LAN), Bluetooth, and satellite communication in a single terminal. The embodiments of the present invention provide a reception apparatus and method of a terminal based on the SDR technique.

Figure 2:
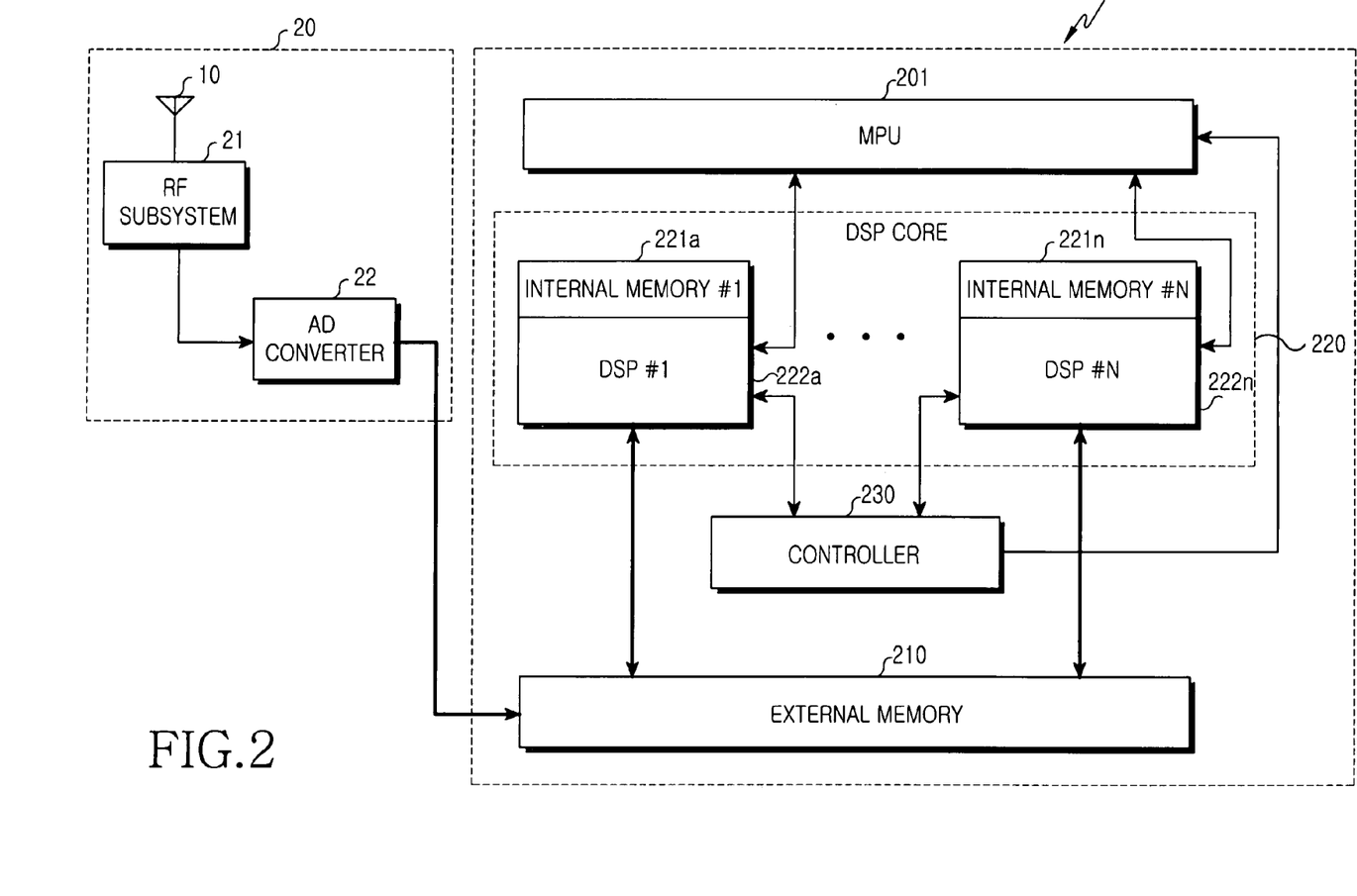
FIG. 2 is a block diagram illustrating a structure of a reception apparatus for a mobile station according to an embodiment of the present invention.

FIG. 2 is a block diagram illustrating a structure of a reception apparatus for a mobile station according to an embodiment of the present invention. Referring to FIG. 2, the reception apparatus of a mobile station includes a radio frequency (RF) processor 20 comprised of an RF subsystem 21 and an analog-to-digital (A/D) converter 22 for converting a received signal into a digital signal, and a modem 200 for demodulating the digital signal converted by software.

The modem 200 is comprised of a digital signal processing unit (DSP core) 220 including N digital signal processors (DSPs) 222a to 222n each having functions for a rake receiver, codec, vocoder, and modulator; a controller 230 for generating a timing signal necessary for demodulation and controlling data transmission; an external memory 210 for storing output data of the A/D converter 22 and output data of the digital signal processing unit 220; and a microprocessor unit (MPU) 201 for controlling the overall operation of the mobile station.

Figure 3:
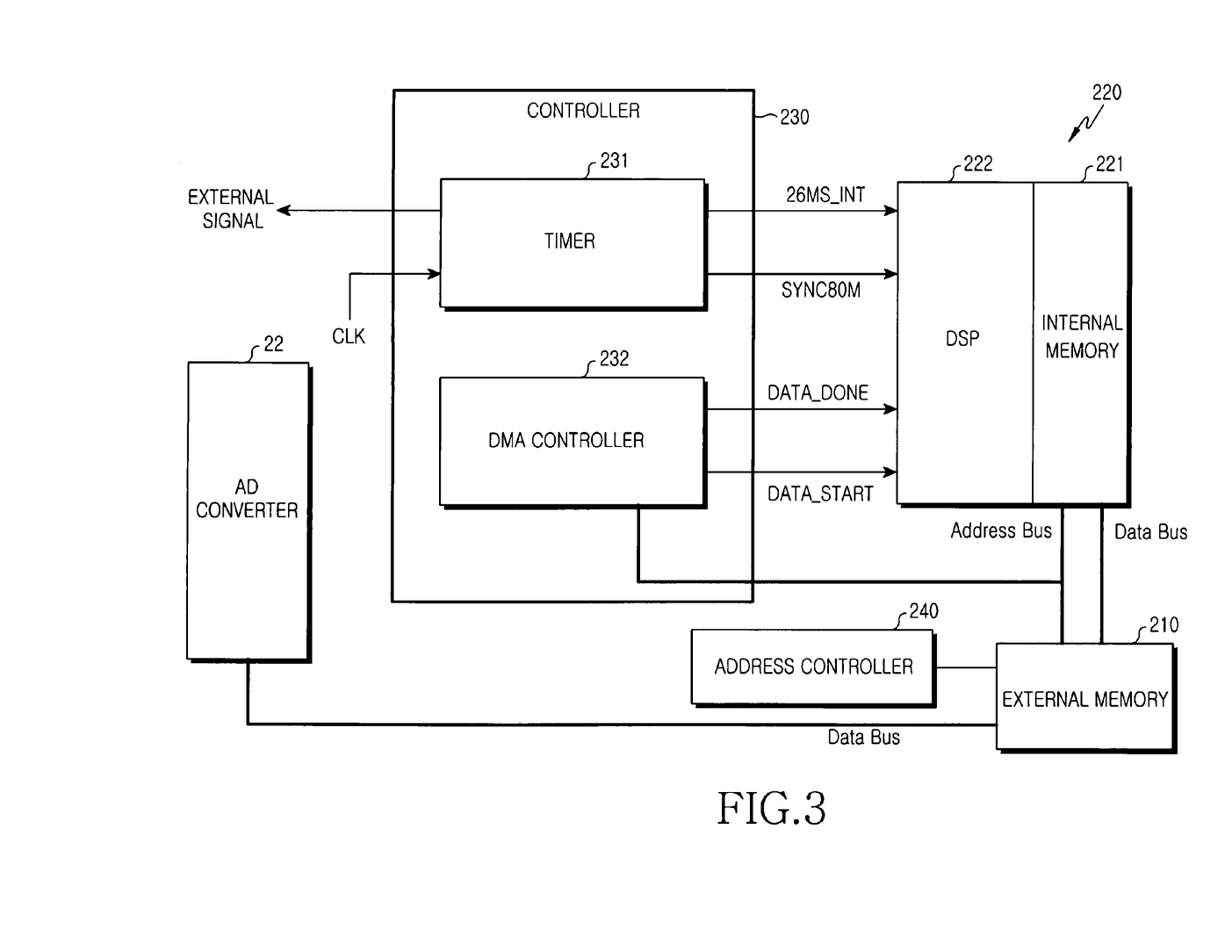
FIG. 3 is a block diagram illustrating a detailed structure of a controller in a reception apparatus of a mobile station according to an embodiment of the present invention.

With reference to FIG. 3, a detailed description will now be made of the internal structure and control process of the controller 230 for controlling data transmission in the modem 200. FIG. 3 is a block diagram illustrating a detailed structure of a controller in a reception apparatus of a mobile station according to an embodiment of the present invention.

Of course, as can be appreciated by those of skill in the art, all of the signal duration times and clock times in the following description are exemplary and are not intended to be limiting and various modifications can be made without departing from the scope and spirit of the embodiments of the present invention.

The controller 230 includes a timer 231 comprised of a plurality of counters, and a Direct Memory Access (DMA) controller 232, and mainly controls generation of a timing signal necessary for a data signal and DMA transmission.

The timer 231 is enabled by a clock CLK received from an external clock generator (not shown), and outputs a 26-ms signal 26MS_INT and an 80-ms sync signal SYNC80MS to the digital signal processing unit 220. The DMA controller 232 exchanges control signals with the digital signal processing unit 220.

The external memory 210 is connected to an address controller 240 for controlling addresses of the data to be stored. Further, the external memory 210 is connected to an internal memory 221 of the digital signal processing unit 220 through an address bus and a data bus. In addition, the external memory 210 is connected to the A/D converter 22 through a data bus. Also, the address bus is connected to the DMA controller 232.

The timer 231 informs the digital signal processing unit 220 of an interrupt signal related to the reference time of a finger (not shown) and a combiner (not shown), and generates an external interrupt signal used for other functions. Typically, such signals include an interrupt signal indicting 26.66 ms and a sync signal indicating an 80-ms boundary. Further, the timer 231 counts the digital-converted I/Q data stored in the external memory 210, and counts the generation of an address where the I/Q data is to be stored. The timer 231 is driven by a clock CLK generated by a clock generator (not shown), and the clock generator outputs a clock signal CLK obtained by frequency-dividing a reference source of 19.2 MHz.

The microprocessor unit 201 exchanges data with the digital signal processing unit 220 through a data bus, and controls the respective external devices.

With reference to the accompanying drawings, a description will now be made of an operation for processing digital signals output from the A/D converter 22 in the reception apparatus. First, an operation for storing I/Q data output from the A/D converter 22 in the external memory 210 will be described herein below.

The I/Q data output from the A/D converter 22 is continuously delivered to the external memory 210 preferably according to a chip×16 clock. The output I/Q data is continuously stored in a predetermined buffer area of the external memory 210 having a size defined in a register, and at this time, the timer 231 counts the stored data.

If the predetermined buffer area is fully filled with data, or, in other words, if counting of the data stored in the external memory 210 by the timer 231 expires, the timer 231 informs the digital signal processing unit 220 when storing data in the external memory 210 is completed. The digital signal processor 222 reads data from the external memory 210 and stores the read data in the internal memory 221. This operation requires a register for indicating a start address where the I/Q data output from the A/D converter 22 starts to be stored in the external memory 210, and a control register for indicating the size of a buffer where the data is written.

Next, with reference to FIG. 4, a description will be made of a double buffering operation of storing I/Q data currently read by the digital signal processing unit 220 in the internal memory 221 as storing I/Q data in the external memory 210 is completed, and at the same time, outputting the data which was previously read and underwent chip processing.

Figure 4:
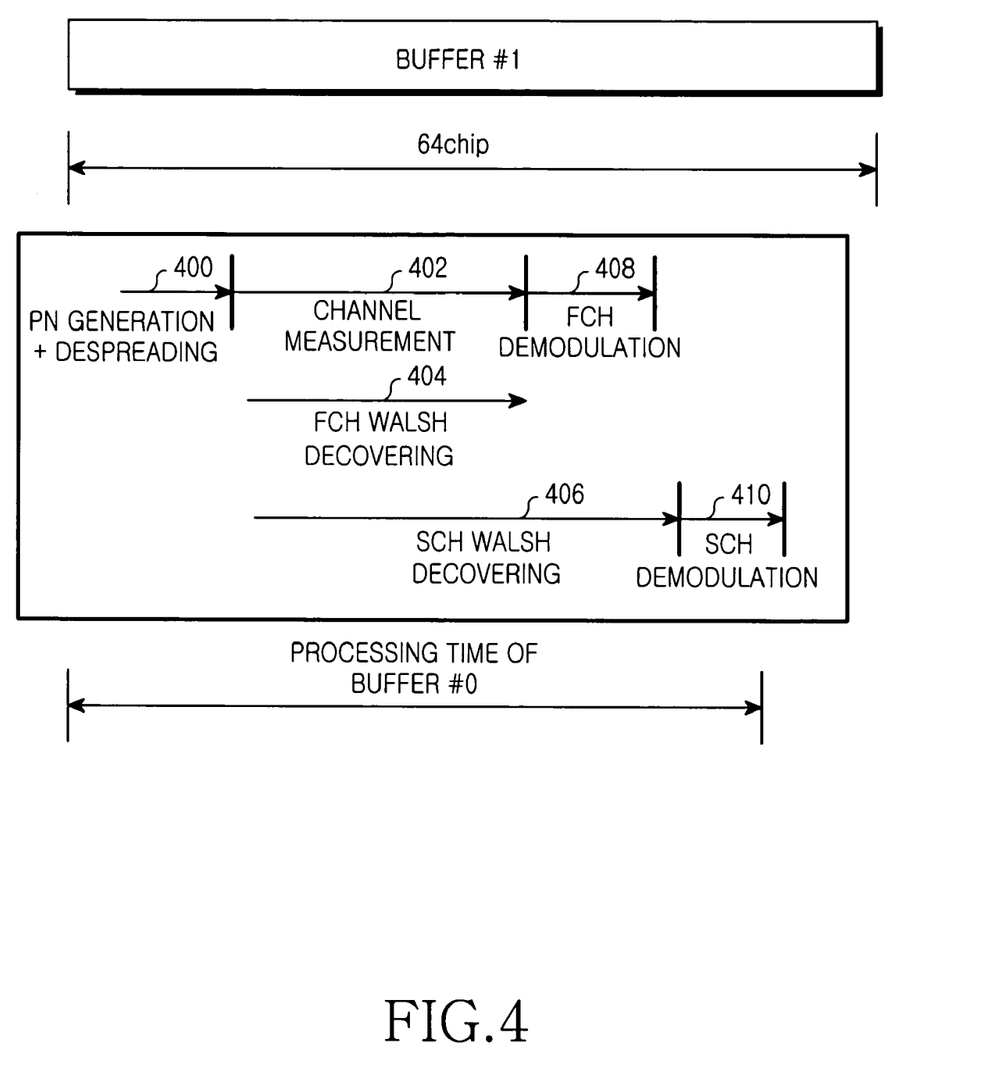
FIG. 4 is a diagram illustrating a double buffering operation according to an embodiment of the present invention.

FIG. 4 is a diagram illustrating a double buffering operation according to an embodiment of the present invention. Herein, the output data of the A/D converter 22 is I/Q samples corresponding to 64 chips. Such an operation represents the processing occurring for 1 power control group (PCG), which is equal to 1.25 ms and is a unit of time for which the external memory 210 transfers data to the digital signal processing unit 220 serving as a codec.

Referring to FIG. 4, the chip processing is divided into a pseudo-noise (PN) code generation and despreading process 400 through PN code generation; a channel measurement process 402 corresponding to pilot filtering; Walsh decovering processes 404 and 406 for a fundamental channel (FCH) and a supplemental channel (SCH), respectively; and symbol demodulation processes 408 and 410 for channel compensation. It is assumed in FIG. 4 that the digital signal processing unit 220 is comprised of one digital signal processor (DSP) and one internal memory.

The digital signal processor 222 starts processing for the rake receiver's function when a buffer area of the external memory 210 is fully filled with the output data. After the digital signal processor 222 finishes chip processing of the 64 chips, it should continuously perform processing on the other 64 chips which were stored in another predetermined buffer area of the internal memory 221 during the chip processing.

In this double buffering operation, the internal memory 221 reads data from one area and performs processing on the read data, and at the same time, stores currently received data in another area. Such processing on 64 chips should be completed before at least one memory area is fully filled with data, in order to enable processing on new 64 chips to be available. Therefore, the foregoing requirements are satisfied by minimizing the DSP calculations.

This method uses the multithread technique for possible concurrent processing, and in each thread, the minimum calculations is possible with 64-chip processing by using the vectorization technique and the bit-vector technique.

More specifically, in FIG. 4, the digital signal processor 222 performs processing using 3 threads. That is, a first thread performs the PN code generation and despreading process 400, the channel measurement process 402, and the FCH demodulation process 408, a second thread performs the FCH Walsh decovering process 404, and a third thread performs the SCH Walsh decovering process 406 and the SCH demodulation process 410.

After the first thread completes the PN code generation and despreading process 400, the first to third threads simultaneously perform the channel measurement process 402, the FCH Walsh decovering process 404, and the SCH Walsh decovering process 406.

That is, if a buffer with a 64-chip size is fully filled with data, the controller 230 generates an interrupt signal and the digital signal processor 222 starts processing. First, the digital signal processor 222 performs the process 400 of generating PN code I/Q corresponding to 64 chips and multiplying the generated PN code I/Q by the data read from a buffer by performing 8 times over-sampling. The generated I/Q chip data is output as a pilot chip accumulation value, an FCH accumulation value, and a SCH accumulation value for compensation of respective channels by performing the channel measurement process 402, the FCH Walsh decovering process 404 and the SCH Walsh decovering process 406. After accumulation is achieved as much of the Walsh length used is for FCH, symbol demodulation is achieved for FCH channel compensation (408), and after accumulation is achieved as much of the Walsh length is used for SCH, symbol demodulation is achieved for SCH channel compensation (410). Symbols generated in this way are continuously stored in the internal memory 221.

If the digital signal processing unit 220 is comprised of two or more digital signal processors and their associated internal memories, the operation of FIG. 4 can be performed in parallel.

Figure 5:
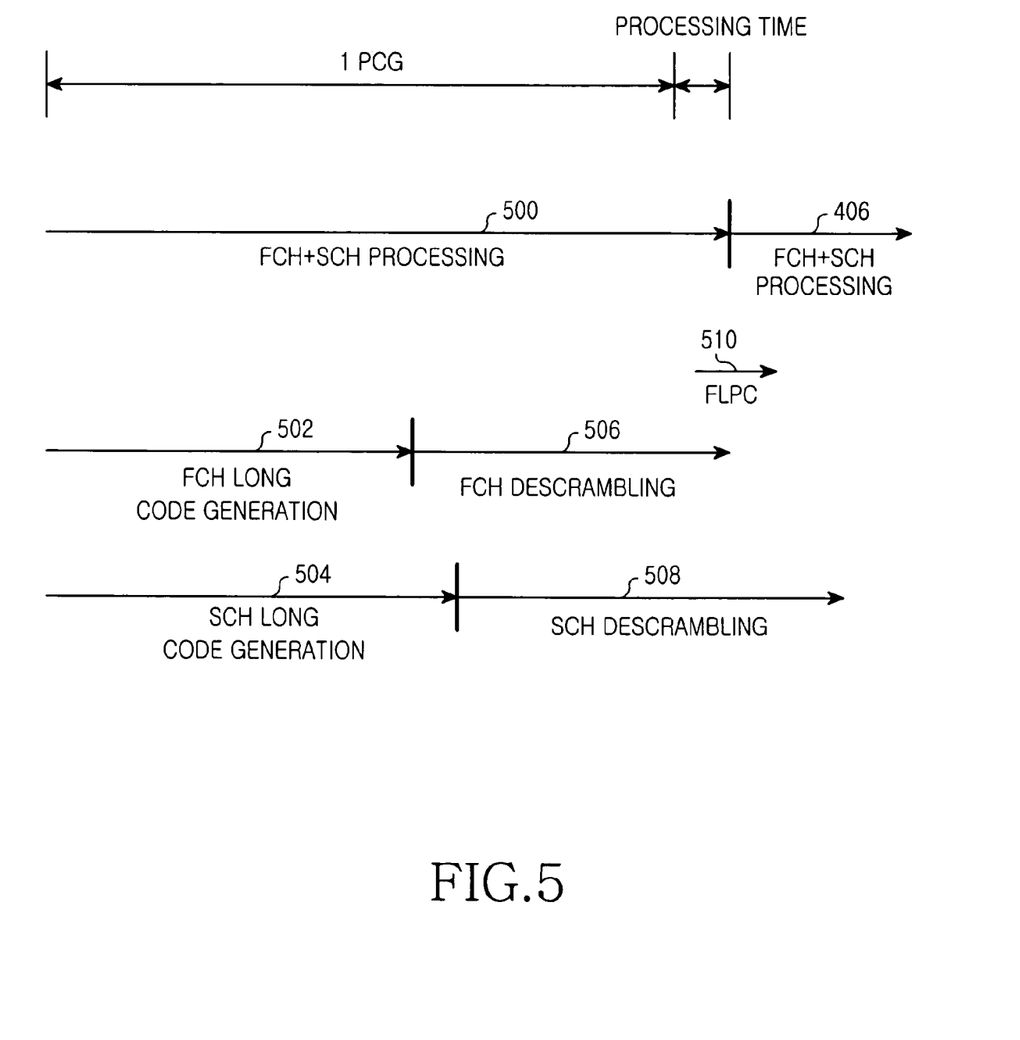
FIG. 5 is a diagram illustrating an operation of processing digital signals on a PCG basis according to an embodiment of the present invention.

FIG. 5 is a diagram illustrating an operation of processing digital signals on a PCG basis according to an embodiment of the present invention. Referring to FIG. 5, the digital signal processing unit 220 performs chip processing on 64 chips for 1 PCG, and stores the generated symbols in the internal memory 221. At the same time, the digital signal processing unit 220 generates long codes (or Walsh codes) for respective traffic channels corresponding to 1 PCG (502 and 504) and stores the generated long codes in the internal memory 221.

After generating all the long codes for the respective channels corresponding to 1 PCG, the digital signal processing unit 220 performs processes 506 and 508, respectively, of descrambling the symbols stored in the internal memory 221. After completing the 1-PCG chip processing, the digital signal processing unit 220 starts a forward link power control (FLPC) process 510 for generating a reverse power control bit, thereby completing processing on all chips corresponding to 1 PCG.

That is, as soon as the FCH and SCH processing process 500 described in connection with FIG. 4 is performed, the FCH long code generation process 502 and the SCH long code generation process 504 are performed. Therefore, the digital signal processing unit 220 requires 3 threads for performing the FCH and SCH processing process 500, 1 thread for performing the FCH long code generation process 502, 1 thread for performing the SCH long code generation process 504, and 1 thread for performing the FLPC process 510 for generating a reverse power control bit.

With reference to the accompanying drawings, a detailed description will now be made of a procedure for processing digital signals in the digital signal processing unit 220.

Figure 6:
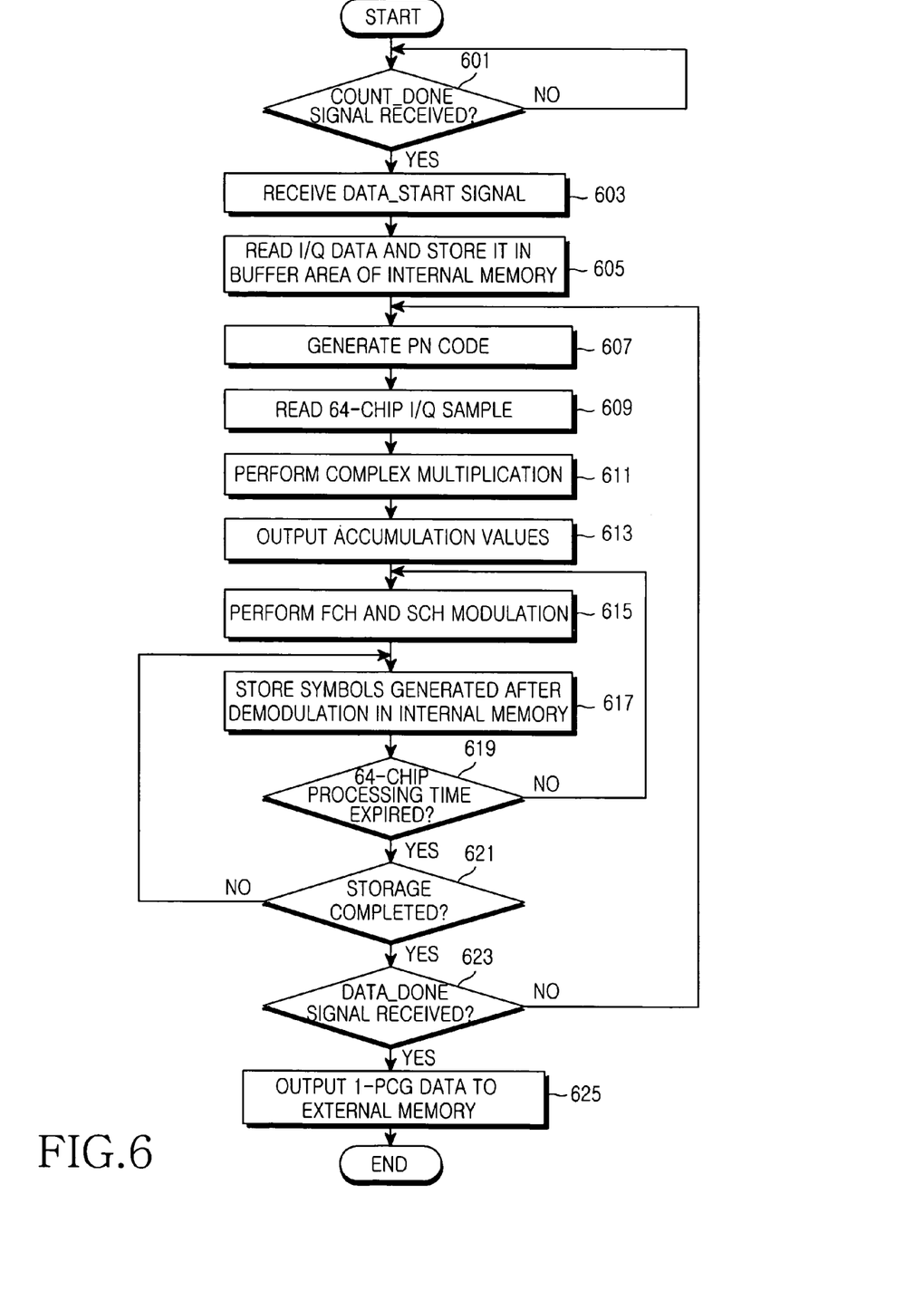
FIG. 6 is a flowchart illustrating an operation of a digital signal processing unit according to an embodiment of the present invention.

FIG. 6 is a flowchart illustrating an operation of a digital signal processing unit according to an embodiment of the present invention. Referring to FIG. 6, if it is determined in step 601 that digital-converted I/Q data is completely stored in the external memory 210, in other words, a COUNT_DONE signal indicating completed counting on the digital-converted I/Q data stored in the external memory 210 is received from the timer 231. The digital signal processing unit 220 transmits a DATA—START signal indicating transmission start to the DMA controller 232 in step 603. In response, the DMA controller 232 generates an address. The I/Q data is written in a predetermined buffer area of the external memory 210 together with the generated address. Such a DMA transmission continues until a counter expires. If the counter expires, thereby completing the DMA transmission, the DMA controller 232 informs the digital signal processing part 220 of completion of the DMA transmission, to end transmission. For such an operation, an address register for indicating the source and the destination of the data and a counter register for indicating the completion of the transmission are required.

In step 605, the digital signal processing unit 220 reads I/Q data stored in the external memory 210 and stores the I/Q data into a corresponding buffer area of the internal memory 221. Here, the buffer area of the internal memory 221, in which the I/Q data is written, has a 64-chip size. However, it is preferable that the buffer size be optimized to within a range that the processing time is not longer than the time for which data is written in the buffer. This is because in a process of reading and writing data through double buffering, chip processing should be ended before the buffer with a 64-chip size is fully filled with data. If the I/Q buffer with a 64-chip size is fully filled with data, the digital signal processing unit 220 performs chip processing.

In step 607, the digital signal processing unit 220 generates PN code I/Q corresponding to 64 chips. In step 609, the digital signal processing unit 220 reads the I/Q data stored in an I/Q buffer with a 64-chip size in the internal memory 221 by performing 8 times over-sampling. Thereafter, in step 611, the digital signal processing unit 220 performs complex multiplication on the read I/Q samples (400).

The I/Q chip data made by the complex multiplication undergoes channel measurement (402), FCH Walsh decovering (404) and SCH Walsh decovering (406). In step 613, the digital signal processing unit 220 outputs a pilot accumulation value, an FCH accumulation value and a SCH accumulation value through the respective processes. In step 615, the digital signal processing unit 220 performs symbol demodulations (408 and 410) for FCH and SCH channel compensation when the accumulation values are accumulated for as much of the Walsh length. Thereafter, in step 617, the digital signal processing unit 220 continuously stores symbols generated through the symbol demodulations in a buffer area of the internal memory 221, which is different from the buffer area from which the I/Q data is read. That is, the digital signal processing unit 220 performs double buffering.

Thereafter, in step 619, the digital signal processing unit 220 determines whether a chip processing time has expired. If it is determined that the chip processing time has not expired, the digital signal processing unit 220 returns to step 615. However, if the chip processing time has expired, the digital signal processing unit 220 determines in step 621 whether storing of symbol data is completed. If it is determined that storing of symbol data is not completed, the digital signal processing unit 220 returns to 617. However, if storing of symbol data is completed, the digital signal processing unit 220 determines in step 623 whether a DATA_DONE signal is received from the DMA controller 232. If it is determined that the DATA_DONE signal is not received, the digital signal processing unit 220 returns to step 607 to perform chip processing on the next 64-chip data. However, if the DATA_DONE signal is received, the digital signal processing unit 220 outputs 1-PCG data to the external memory 210 in step 625. Herein, the data transmission from the internal memory 221 in the digital signal processing unit 220 to the external memory 210 is achieved by a DMA operation. The PCG is a unit time for which a rake receiver of the digital signal processing unit 220 stores data in its internal memory 221, and as many symbols as the PCG allows are stored in the internal memory 221. The symbol data stored in the internal memory 221 is transmitted to the external memory 210 by DMA.

Because the external memory 210 storing therein the data output from the internal memory 221 is shared by respective cores, the controller 230 generates an interrupt signal for a corresponding core at the completion of a DMA transmission so that a codec core, another DSP core, reads the data.

Referring back to FIG. 5, as soon as the 64-chip FCH and SCH processing 500 occurs, FCH and SCH long code generators (not shown) generate long codes (or Walsh codes) corresponding respective masks (502 and 504). When long codes for respective channels corresponding to 1 PCG are generated, symbols stored in the internal memory 221 of the DSP core are subjected to FCH and SCH descrambling with the long codes (506 and 508). After completion of 64-chip processing, a forward link power controller (FLPC) 510 is enabled to determine a reverse power control bit so that a modulation core can read the determined reverse power control bit.

Although the present invention is applied to a CDMA system in which a reception apparatus for a mobile station is realized with a DSP, it can also be applied to a non-CDMA system by replacing the firmware of the DSP with the firmware of the corresponding system, so that the replaced firmware can be used as an appropriate reception apparatus in the corresponding system.

As can be understood from the foregoing description, a receiver for a mobile station according to an embodiment of the present invention performs complicated calculations without modification of hardware by simply modifying the software of a receiver based on SDR and DSP technologies. Therefore, the mobile station can receive a global roaming service.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A reception apparatus of a mobile station in a Software Defined Radio (SDR) mobile communication system, comprising:
   a radio frequency (RF) processor for converting a received RF signal into a digital signal, and outputting data on a per-unit basis according to a predetermined clock;
   an external memory for storing the output data in a predetermined buffer area; and
   a digital signal processing unit, for reading stored data in the external memory, storing the read data in an internal memory, and performing digital signal processing on the read data samples as while storing the data in the external memory is completed, wherein the digital signal processing unit comprises:
   at least one digital signal processor for reading the stored data and demodulating the read data while storing the data in the external memory is completed;
   the internal memory for storing the demodulated data, and outputting previously-demodulated data stored in the internal memory, upon receiving a data-done signal; and
   a controller for generating an address corresponding to the stored data and counting the data to be subjected to digital signal processing.

2. The reception apparatus of claim 1, wherein the controller comprises:
   a Data Memory Access (DMA) controller for controlling generation of an address corresponding to the stored data, and transmitting a data-done signal to the digital signal processor each time the demodulated data is stored in the internal memory on a per-unit basis; and
   a plurality of timers for counting data stored in the internal memory and generating a sync signal and an interrupt signal according to a predetermined clock.

3. The reception apparatus of claim 1, wherein the data-done signal is received on a 1.25-ms power control group (PCG) basis.

4. The reception apparatus of claim 1, wherein the output data is transmitted to the external memory in real time according to a 16-chip clock, and is stored in the external memory by a 64-chip size.

5. The reception apparatus of claim 1, wherein the digital signal processor generates pseudo-random noise (PN) code I/Q by reading stored data samples as storing the data in the external memory is completed, generates I/Q chip data by despreading the read data samples with the generated PN code I/Q, and simultaneously performs a channel measurement operation and an Fundamental Channel (FCH) Walsh decovering and Supplemental Channel (SCH) decovering operation on the I/Q chip data.

6. The reception apparatus of claim 5, wherein the digital signal processor performs a symbol demodulation operation for FCH channel compensation as the FCH Walsh decovering operation is completed, performs a symbol demodulation operation for SCH channel compensation as the SCH Walsh decovering operation is completed, performs digital signal processing on the respective channels, and stores generated symbols in the internal memory.

7. The reception apparatus of claim 5, wherein the digital signal processor reads the data from the internal memory, performs digital signal processing on the FCH and the SCH and at substantially the same time, stores currently received data in the internal memory.

8. The reception apparatus of claim 6, wherein the digital signal processor performs digital signal processing on the respective channels for a minimum processing unit and, at substantially the same time, generates long codes for the respective channels corresponding to the minimum processing unit and stores the generated long codes in the internal memory.

9. The reception apparatus of claim 8, wherein the digital signal processor descrambles symbols stored in the internal memory if long codes for the respective channels are all generated, and generates a reverse power control bit if the digital signal processing for the minimum processing unit is completed.

10. A method for performing digital signal processing on a received radio frequency (RF) signal by software in a receiver for a mobile station of a Software Defined Radio (SDR) mobile communication system, comprising the steps of:
    (a) converting a received RF signal into a digital signal, and outputting data on a per-unit basis according to a predetermined clock by a RF processor;
    (b) storing the output data in a predetermined buffer area on a per-unit basis; and
    (c) reading stored data samples and performing digital signal processing on the read data samples while storing the data is completed by a signal processing unit, wherein the step (c) comprises the steps of:
    (c-1) reading the stored data and demodulating the read data as storing the data is completed;
    (c-2) storing the demodulated data; and
    (c-3) repeating the steps (c-1) and (c-2) until a data-done signal is received.

11. The method of claim 10, further comprising the steps of:
    controlling the generation of an address corresponding to the stored data, and transmitting a data-done signal each time the demodulated data is stored on a per-unit basis; and
    counting the stored data and generating a sync signal and an interrupt signal according to a predetermined clock.

12. The method of claim 11, further comprising the step of outputting all stored data through the repetition of steps (c-1) and (c-2) upon receiving the data-done signal.

13. The method of claim 10, further comprising the step of outputting all stored data through the repetition of steps (c-1) and (c-2) upon receiving the data-done signal.

14. The method of claim 10, wherein the data-done signal is received on a 1.25-ms power control group (PCG) basis.

15. The method of claim 10 wherein the output data is transmitted to the external memory in real time according to a 16-chip clock, and is stored in the external memory by the 64-chip size.

16. The method of claim 10, wherein the step (c) comprises the steps of:

generating pseudo-random noise (PN) code I/Q by reading stored data samples as storing the data is completed; and generating I/Q chip data by despreading the read data samples with the generated PN code I/Q, and simultaneously performing a channel measurement operation and an FCH (Fundamental Channel) Walsh decovering and SCH (Supplemental Channel) decovering operation on the I/Q chip data.

17. The method of claim 16, further comprising the step of performing a symbol demodulation operation for FCH channel compensation as the FCH Walsh decovering operation is completed, performing a symbol demodulation operation for SCH channel compensation as the SCH Walsh decovering operation is completed, performing digital signal processing on the respective channels, and storing generated symbols in the buffer area.

18. The method of claim 16, further comprising the step of reading the data, performing digital signal processing on the FCH and the SCH, and at substantially the same time, storing currently received data in the buffer area.

19. The method of claim 17, further comprising the step of performing digital signal processing on the respective channels for a minimum processing unit, and at substantially the same time, generating long codes for the respective channels corresponding to the minimum processing unit and storing the generated long codes in the buffer area.

20. The method of claim 19, further comprising the step of descrambling symbols stored in the buffer area if long codes for the respective channels are all generated, and generating a reverse power control bit if the digital signal processing for the minimum processing unit is completed.

* * * * *